(12) United States Patent
Naka et al.

(10) Patent No.: US 8,577,361 B2
(45) Date of Patent: Nov. 5, 2013

(54) WIRELESS COMMUNICATION BASE STATION DEVICE AND TOTAL TRANSMISSION POWER REGULATING METHOD

(75) Inventors: Katsuyoshi Naka, Osaka (JP); Jinsong Duan, Kanagawa (JP)

(73) Assignee: Panasonic Corporation, Osaka (JP)

( * ) Notice: Subject to any disclaimer, the term of this patent is extended or adjusted under 35 U.S.C. 154(b) by 170 days.

(21) Appl. No.: 13/128,852

(22) PCT Filed: Nov. 27, 2009

(86) PCT No.: PCT/JP2009/006432
§ 371 (c)(1),
(2), (4) Date: May 11, 2011

(87) PCT Pub. No.: WO2010/061628
PCT Pub. Date: Jun. 3, 2010

(65) Prior Publication Data
US 2011/0217974 A1    Sep. 8, 2011

(30) Foreign Application Priority Data

Nov. 28, 2008    (JP) .................................. 2008-304661

(51) Int. Cl.
*H04W 24/00*    (2009.01)
*H04W 4/00*    (2009.01)

(52) U.S. Cl.
USPC ......... 455/423; 455/411; 455/422.1; 455/422

(58) Field of Classification Search
USPC ....................... 455/423, 422.1, 411, 450, 560
See application file for complete search history.

(56) References Cited

U.S. PATENT DOCUMENTS

2008/0102794 A1*   5/2008 Keevill et al. ................. 455/411
2009/0042595 A1*   2/2009 Yavuz et al. .................. 455/522
(Continued)

FOREIGN PATENT DOCUMENTS

GB              2 428 937      2/2007
WO    WO 2008098898 A2 *  8/2008

OTHER PUBLICATIONS

3GPP TSG-RAN Working Group 4 (Radio) meeting #44ibs,"LTE Home Node B Downlink simulation results with flexible Home Node B Power", Nokia Siemens Networks, R4-071540 Oct. 8-12, 2007, pp. 1-6.

(Continued)

*Primary Examiner* — Jinsong Hu
*Assistant Examiner* — William Nealon
(74) *Attorney, Agent, or Firm* — Dickinson Wright PLLC (57) ABSTRACT

Disclosed are a wireless communication base station and a total transmission power regulating method that reduce interference to macrocell users near a femtocell and interference to neighboring femtocell users near the femtocell in a balanced manner, while ensuring throughput of the femtocell users. A reception power measuring unit (214) measures the reception power of a CPICH. A cell type discriminating unit (216) judges whether the received signal is a signal from a macro base station or a signal from a femto base station. When a signal from a macro base station is received, a total downlink transmission power setting unit (217) executes a first-stage interference regulation based on the strongest CPICH reception power value and calculates a tentative value for the total downlink transmission power of a femto base station (110). When a signal from a peripheral femto base station is received, the total downlink transmission power setting unit (217) executes a second-stage interference regulation within a fixed power regulation range for the second-stage interference regulation based on the strongest CPICH reception power value, and calculates a final total downlink transmission power value.

13 Claims, 10 Drawing Sheets

(a)

(b)

(56) References Cited

U.S. PATENT DOCUMENTS

2009/0093246 A1* 4/2009 Czaja et al. ............... 455/422.1
2009/0137241 A1* 5/2009 Yavuz et al. ............... 455/423
2009/0253421 A1* 10/2009 Camp et al. ............... 455/418

OTHER PUBLICATIONS

International Search Report dated Feb. 15, 2010 for PCT/JP2009/006432.

* cited by examiner

WIRELESS COMMUNICATION BASE STATION DEVICE AND TOTAL TRANSMISSION POWER REGULATING METHOD

TECHNICAL FIELD

The present invention relates to a wireless communication base station apparatus and total transmission power control method to reduce interference against neighboring cells.

BACKGROUND ART

There are ongoing discussions about introduction of an ultra-small wireless base station (hereinafter called "femto base station (HNB: Home Node B)" in cellular systems typified by WCDMA (Wideband Code Division Multiple Access). By providing a femto base station in a building of an ordinary household or an office where the propagation environment is comparatively poor, it is possible to cover an area of a radius of several tens of meters or so and achieve faster wireless transmission in the area where the femtocell is set up.

Since existing cellular systems are presumed to use all operation frequency bands in urban areas, it is difficult to secure a dedicated frequency band for femto base stations, and it is therefore more likely that frequency sharing is required between femto base stations and existing macro base stations. In addition, it is likely to support a CSG (Closed Subscriber Group)-based access limiting function which allows only a party to provide a femto base station to perform communication using that femto base station.

If a femto base station is introduced in an existing cellular system based on these conditions, mutual downlink interference, which the femto base station gives to an existing macrocell user (MUE: Macro User Equipment), or which an existing macro base station gives to a femtocell user (HUE: Home User Equipment), becomes a problem. Especially, in HSDPA (High Speed Data Packet Access) transmission, in which a base station carries out downlink transmission at maximum power, interference is a significant problem. A user of a femto base station set up near a macro base station receives significant interference from the macro base station. Meanwhile, a macrocell user located near a femto base station set up near a cell edge of a macro base station receives significant interference from the femto base station.

Figure 1:
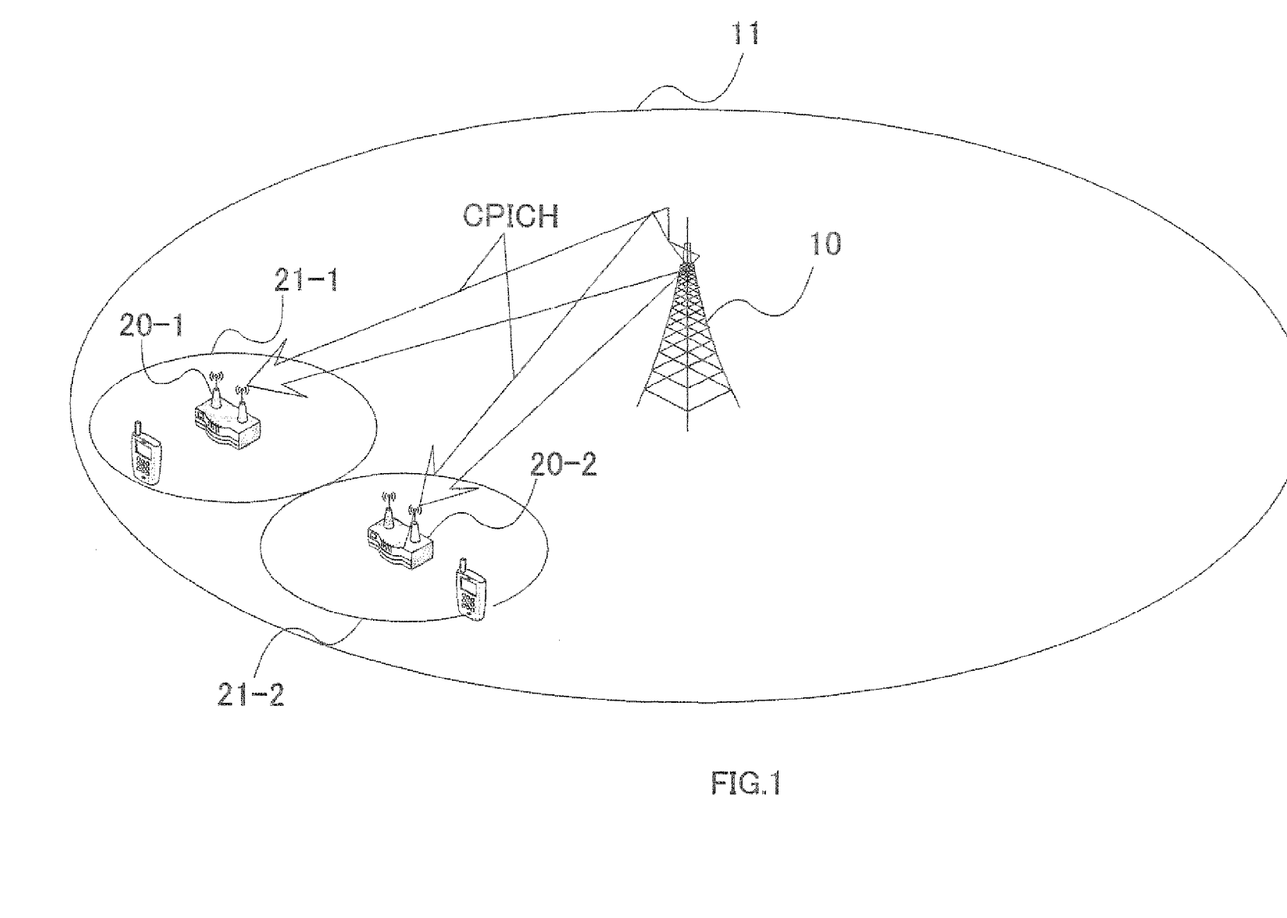
FIG. 1 shows a configuration of a wireless system where femto base stations are set up in the cover area of a macro base station.

Non-Patent Literature 1 discloses a downlink interference control method in a femto base station set up in a cellular system. This interference control method will be described below with reference to FIG. 1. FIG. 1 shows the configuration of a wireless system where femto base stations are set up in the cover area of a macro base station.

According to the interference control method disclosed in Non-Patent Literature 1, as shown in FIG. 1, each femto base station 20-1 or 20-2 measures the reception power level of a common pilot signal (CPICH: Common Pilot Channel) transmitted from macro base station 10 to calculate wave pathloss (pathloss+shadowing) between macro base station 10 and femto base station 20-1 or wave pathloss between macro base station 10 and femto base station 20-2. The total downlink transmission power of each femto base station is decided from the pathloss between macro base station 10 and femto base station 20-1 or from the pathloss between macro base station 10 and femto base station 20-2, according to the total downlink transmission power determining function of femto base station 20-1 or femto base station 20-2 shown in FIG. 2. According to the method, a femto base station executes a control such that the closer to a macro base station a femto base station is located, the higher femto base station transmission power is increased, and the farther from a macro base station a femto base station is located, the lower femto base station transmission power is decreased.

Figure 3:
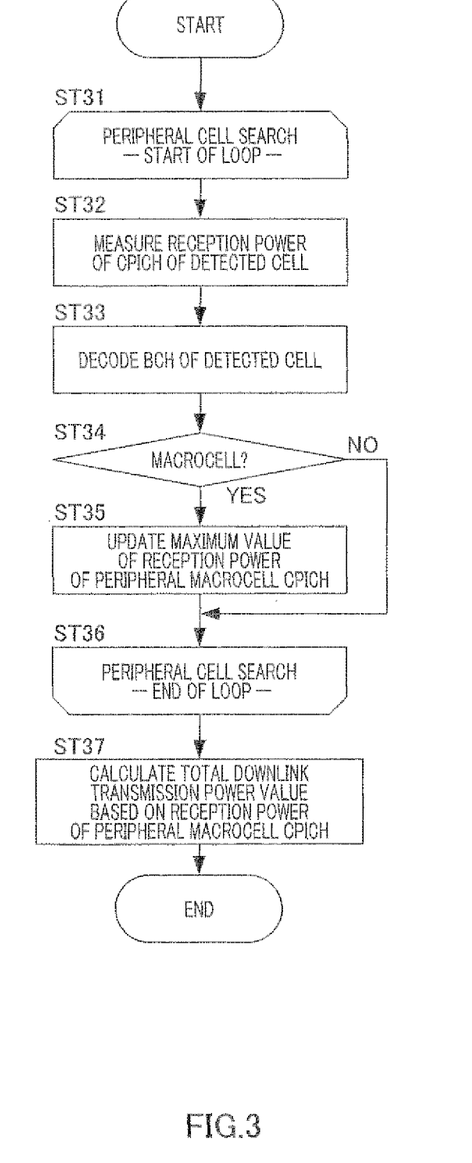
FIG. 3 is a flowchart illustrating the operational steps of the interference control method disclosed in Non-Patent Literature 1.

Next, the operational steps of the interference control method disclosed in Non-Patent Literature 1 will be described below with reference to FIG. 3. In FIG. 3, a peripheral cell search is started in step ST31. In this peripheral cell search, a peripheral cell is determined to be present at a timing a correlation value to exceed a predetermined threshold is found as a result of synchronous channel correlation calculation.

The reception power of the CPICH from the detected cell is measured in step ST32, and the scrambling code of the detected cell is identified to decode broadcast information (BCH) in step ST33.

In step ST34, the transmission power value of the detected cell is acquired from the decoded broadcast information. When the acquired transmission power value is equal to or greater than a predetermined threshold, the detected cell is determined to be a macrocell, and the flow proceeds to step ST35. When the acquired transmission power value is less than the predetermined threshold, the detected cell is determined to be a femtocell, and the flow proceeds to step ST36.

In step ST35, when a reception power value in the detected macrocell is found to exceed the maximum value held, the maximum value is updated, and the macro base station of the strongest reception power and its reception power value are held.

In step ST36, whether the processes of steps ST32 through step ST35 are finished with respect to all timings where a synchronous channel correlation calculation result to exceed a predetermined threshold is found, and, if these processes are finished for all timings, a peripheral cell search is finished, or, if these processes are not finished for all timings, a peripheral cell search continues being repeated.

Figure 2:
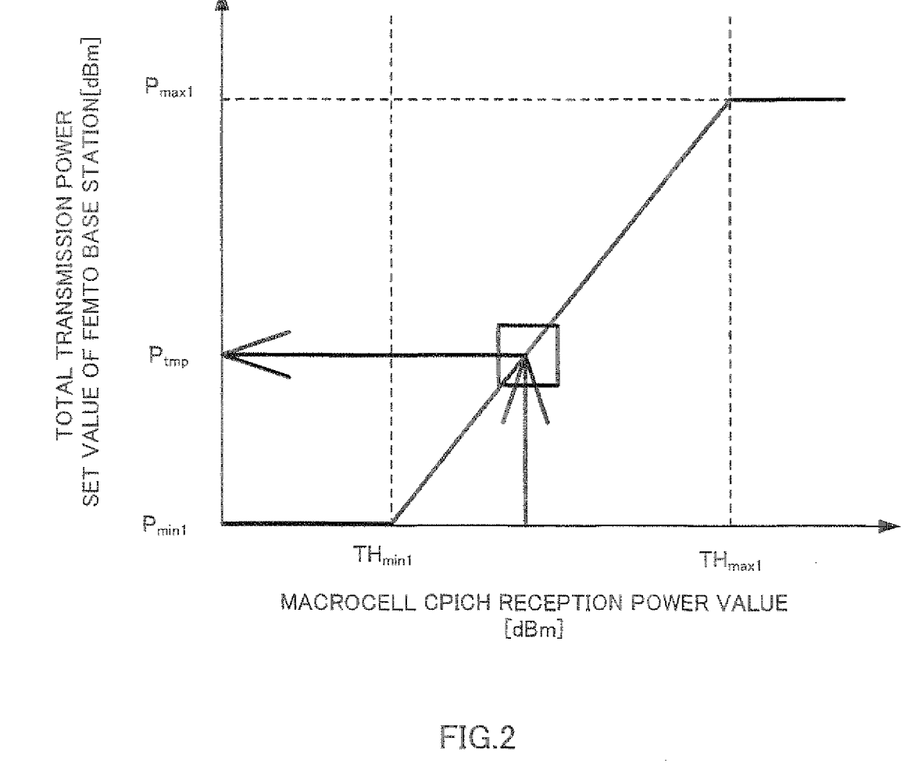
FIG. 2 shows a total downlink transmission power determining function of a femto base station.

In step ST37, the set value of total downlink transmission power is calculated based on the measured strongest CPICH reception power value of peripheral cells. To be more specific, as shown in FIG. 2, the greater CPICH reception power is, the higher the total downlink transmission power value is set in a range between the maximum value (Pmax1) and the minimum value (Pmin1) of the values of power that can be transmitted by a femto base station, and the lower CPICH reception. power is, the lower the total downlink transmission power is set in that range.

By executing such a total downlink transmission power control for a femto base station, the following advantages are achieved. Since the desirable wave power for a femtocell user who has received significant interference from a macro base station near the macro base station is increased, the SIR (Signal to Interference Ratio) of the femtocell user can be improved. Since interference power on a macrocell user who has received significant interference from a femto base station is reduced at a macrocell edge, the SIR of the macrocell user can be improved.

CITATION LIST

Non-Patent Literature

NPL 1: 3GPP TSG RAN Working Group 4, R4-071540 (2007-10) "LTE Home Node B downlink simulation results with flexible Home Node B power"

SUMMARY OF INVENTION

Technical Problem

The interference control technique disclosed in Non-Patent Literature 1 can endure interference from a macro base station or reduce the amount of interference against a macrocell user based on the femto base station arrangement in a macrocell. If near a femto base station another femto base station is set up, however, a case might occur where the interference between a femtocell and its neighboring femtocell increases beyond the interference between these femtocells and a macrocell. In this case, the technique disclosed in Non-Patent Literature 1 cannot reduce femtocell-neighboring femtocell interference, so that the throughput of a femtocell user of the local station or a femtocell user (neighboring femtocell user) of the neighboring femto base station is degraded.

The present invention has been made in view of the above, and it is an object of the invention to provide a wireless communication base station apparatus and total transmission power control method to reduce interference against a macrocell user near a femtocell and interference against a user of a neighboring femtocell near the femtocell, in a well balanced manner, while securing the throughput of the femtocell user.

Solution to Problem

A wireless communication base station apparatus according to the invention includes a measuring section that measures a reception level of a downlink common pilot signal, a determination section that determines whether the received downlink common pilot signal is a signal transmitted from a macro base station or a signal transmitted from a peripheral femto base station, and a power control section that executes a first power control to control total downlink transmission power according to a reception level of the downlink common pilot signal transmitted from the macro base station when the downlink common pilot signal is determined to be the signal transmitted from the macro base station, and executes a second power control to control the total downlink transmission power according to a result of the first power control and the reception level of the downlink common pilot signal transmitted from the femto base station when the measured downlink common pilot signal is determined to be the signal transmitted from the femto base station.

A total transmission power control method according to the invention includes a measuring step of measuring a reception level of a downlink common pilot signal, a determination step of determining whether the received downlink common pilot signal is a signal transmitted from a macro base station or a signal transmitted from a peripheral femto base station, and a power control step of executing a first power control to control total downlink transmission power according to a reception level of the downlink common pilot signal transmitted from the macro base station when the downlink common pilot signal is determined to be the signal transmitted from the macro base station, and executing a second power control to control the total downlink transmission power according to a result of the first power control and the reception level of the downlink common pilot signal transmitted from the femto base station when the measured downlink common pilot signal is determined to be the signal transmitted from the femto base station.

Advantageous Effects Of Invention

The present invention can reduce interference against a macrocell user near a femtocell and interference against a user of a neighboring femtocell near the femtocell, in a well-balanced manner, while securing the throughput of the femtocell user.

DESCRIPTION OF EMBODIMENTS

Now, embodiments of the present invention will be described below in detail with reference to the accompanying drawings. Parts having the same functions between embodiments will be assigned the same reference numerals and overlapping descriptions will not be given.

(Embodiment 1)

Figure 4:
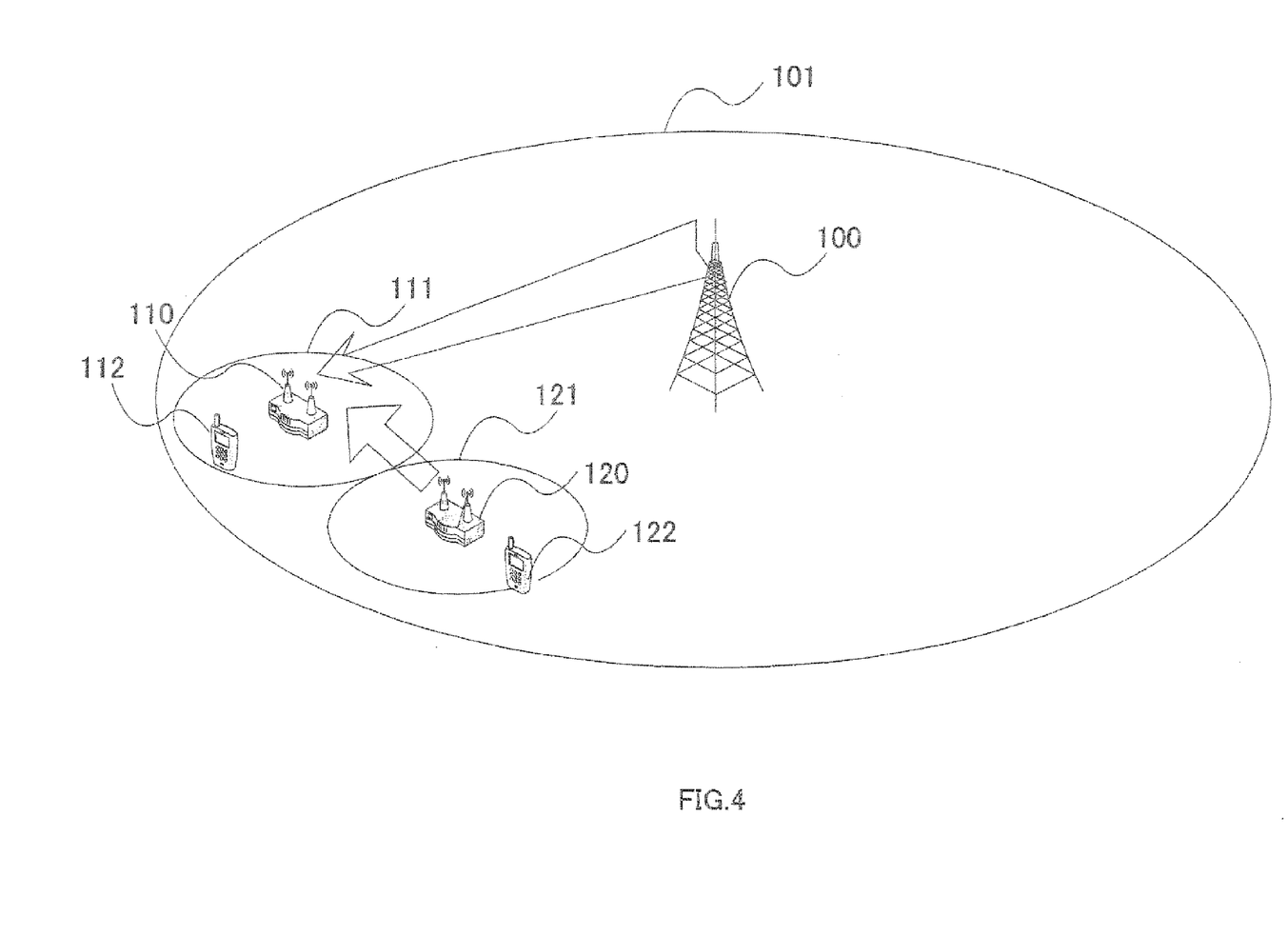
FIG. 4 shows an example of the cell structure in a cellular system according to embodiment 1 of the present invention.

FIG. 4 shows an example of a cell structure in a cellular system according to embodiment 1 of the present invention. FIG. 4 illustrates a case where, in macrocell 101 formed by macro base station 100, femto base station 110 is set up and femto base station 120 is set up near femto base station 110.

Femto base station 110 forms femtocell 111 in which femtocell user 112, being able to connect with femto base station 110, communicates with femto base station 110. Likewise, femto base station 120 forms femtocell 121 in which femtocell user 122, being able to connect with femto base station 120, communicates with femto base station 120.

Figure 5:
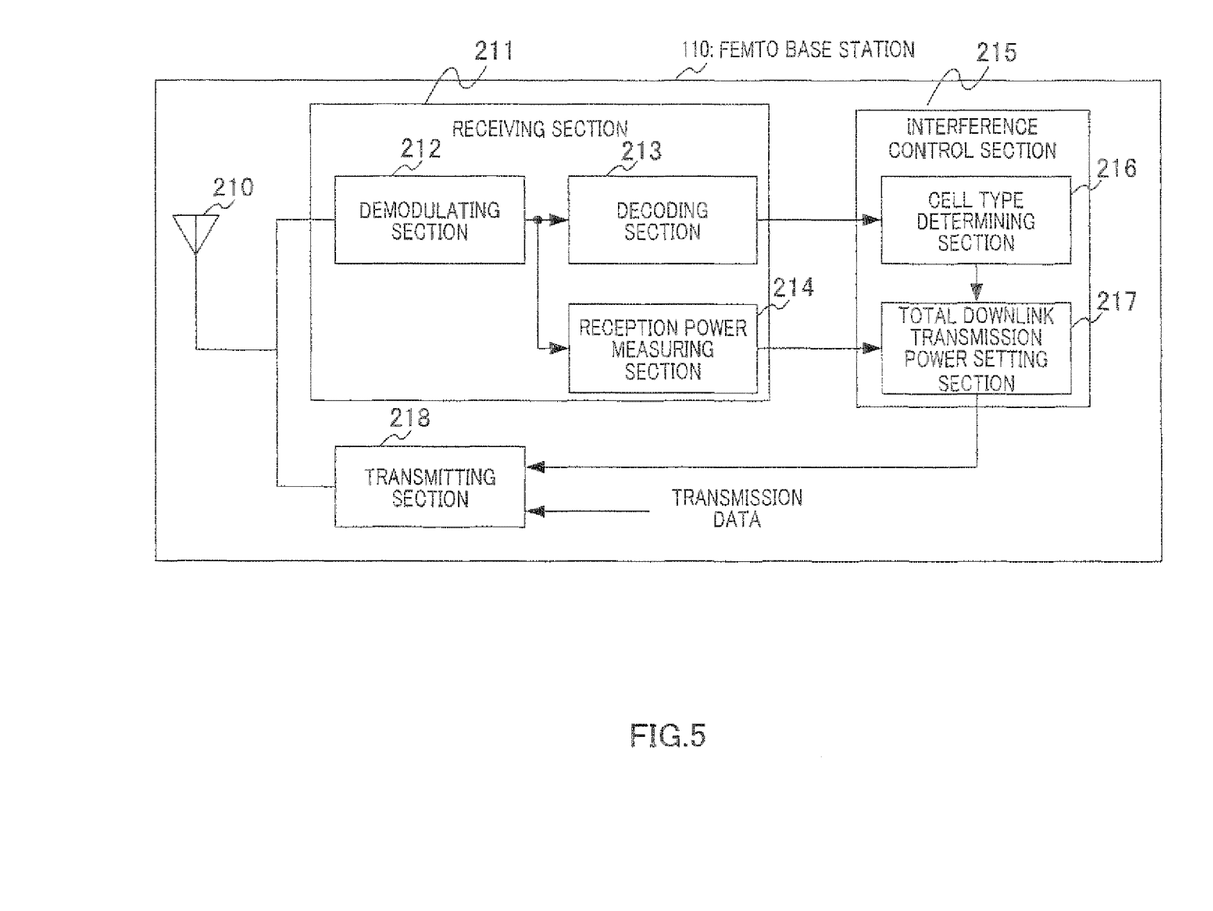
FIG. 5 is a block diagram showing the configuration of the femto base station shown in FIG. 4.

FIG. 5 is a block diagram showing the configuration of femto base station 110 shown in FIG. 4. Femto base station 110 shown in FIG. 5 has antenna 210, receiving section 211, interference control section 215, and transmitting section 218. Receiving section 211 has demodulating section 212, decoding section 213 and reception power measuring section 214. Interference control section 215 has cell type determining section 216 and total downlink transmission power setting section 217.

Demodulating section 212 executes predetermined demodulation on a signal received via antenna 210, and outputs the demodulated signal to decoding section 213 and reception power measuring section 214. Decoding section 213 executes predetermined decoding, such as despreading or error correction decoding, on a signal output from demodulating section 212. When femto base station 110 executes interference control, decoding section 213 decodes broadcast information (BCH: Broadcast Channel) from a macro base station or a peripheral femto base station, and outputs decoded data to cell type determining section 216 in interference control section 215. Reception power measuring section 214 measures CPICH reception power using the signal output from demodulating section 212, and outputs the measured value to total downlink transmission power setting section 217 in interference control section 215.

Cell type determining section 216 refers to a transmission power value included in the broadcast information output from decoding section 213, and determines that a signal has been received from a macro base station when the transmission power value exceeds a predetermined threshold. On the other hand, when the transmission power value is less than the predetermined threshold, cell type determining section 216 determines that a signal from a neighboring femto base station has been received. Cell type determining section 216 outputs the result of the cell type determination to total downlink transmission power setting section 217.

Figure 6:
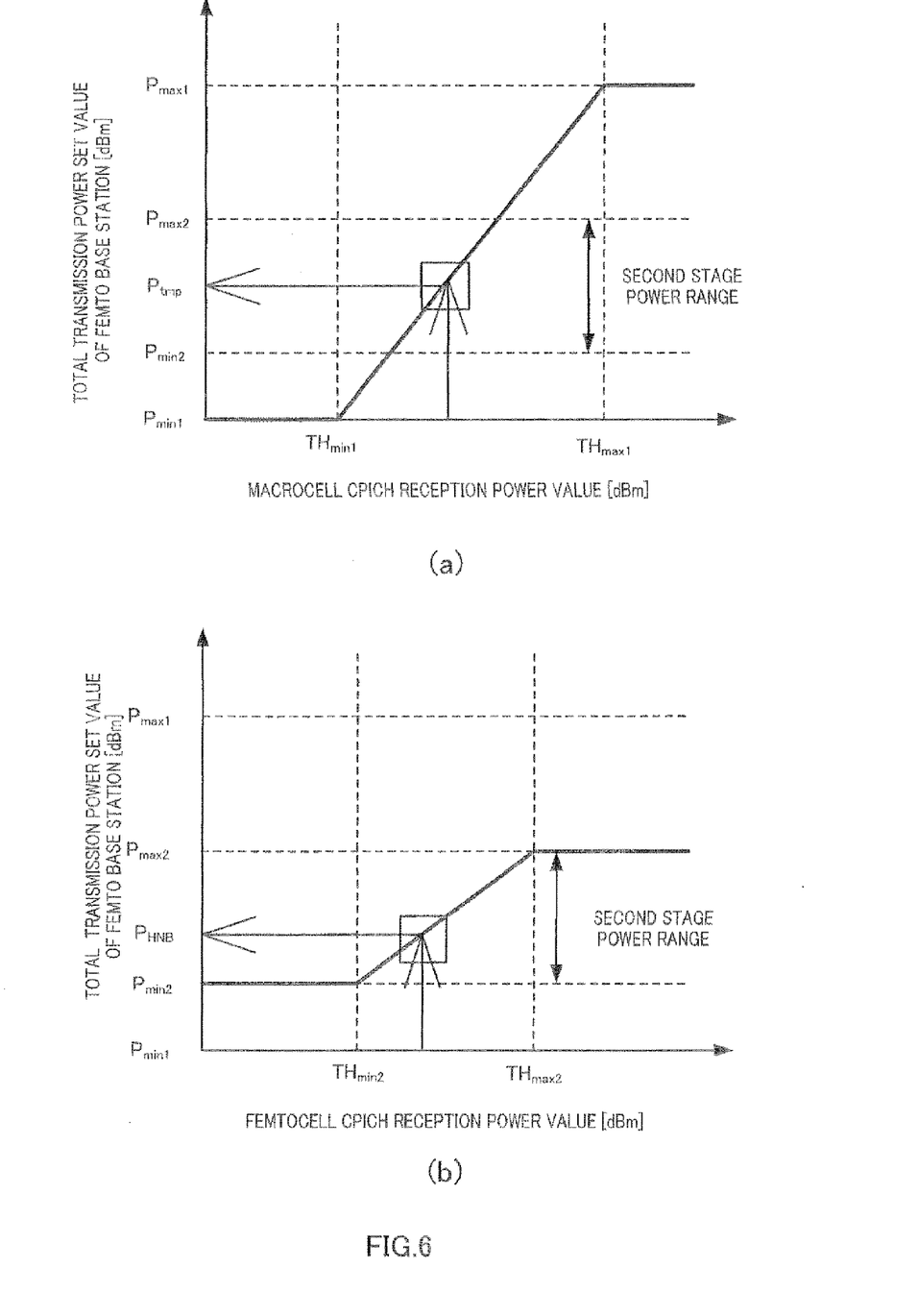
FIG. 6 illustrates a transmission power setting method in the total downlink transmission power setting section shown in FIG. 5.

When the cell type determination result output from cell type determining section 216 indicates a macro base station, total downlink transmission power setting section 217 executes the first-stage interference control shown in FIG. 6A, based on the strongest CPICH reception power value in the CPICH reception power values output from reception power measuring section 214, and calculates a temporary value (Ptmp) of total downlink transmission power of femto base station 110. Total downlink transmission power setting section 217 also sets a fixed power control range for a second-stage interference control.

When the cell type determination result output from cell type determining section 216 indicates a peripheral femto base station, total downlink transmission power setting section 217 executes the second-stage interference control shown in FIG. 6B, in a predetermined power control range (that is, from Pmin2 to Pmax2), based on the strongest CPICH reception power value in the CPICH reception power values output from reception power measuring section 214, and calculates the final value (PHNB) of total downlink transmission power of femto base station 110. The calculated final femto base station total downlink transmission power value is output to transmitting section 218.

The power setting range may be determined based on the location. where a femto base station is set up in a macrocell. That is to say, the power setting range for the second stage is calculated based on macrocell CPICH reception power. Furthermore, total downlink transmission power may be calculated based on macrocell CPICH reception power by reversing the sequence between the first stage and the second stage.

When a femto to base station is set in a location outside a macrocell area, the macrocell cannot be detected when the first-stage interference control is carried out, and, in this case, the second-stage interference control is carried out in the power control range (from Pmin1 to Pmax1) used in the first-stage interference control. Furthermore, when a peripheral femto base station cannot be detected either, the femto base station executes transmission at the maximum total transmission power (Pmax2), without executing an interference control.

Figure 7:
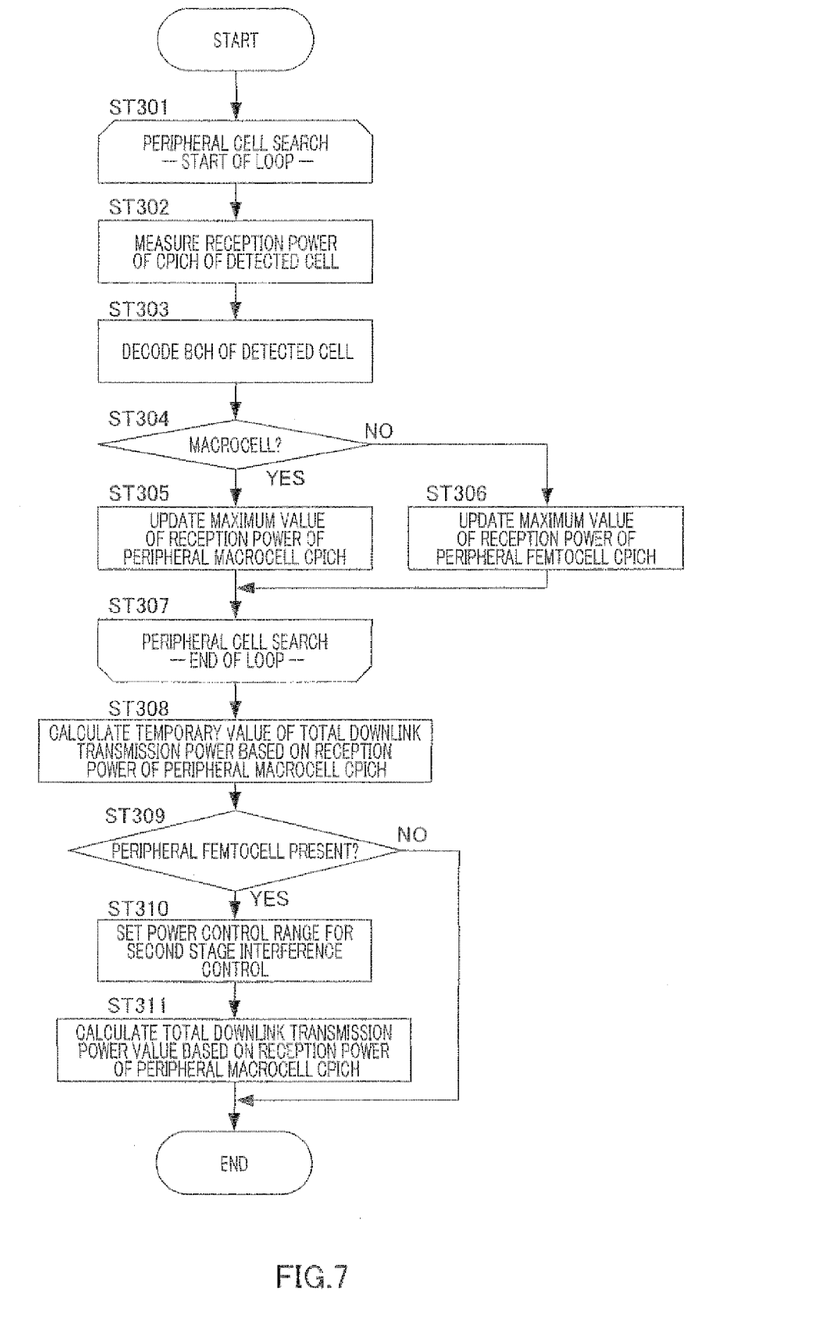
FIG. 7 is a flowchart illustrating the operational steps of the interference control method in the interference control section shown in FIG. 5.

Next, the steps of interference control in interference control section 215 will be described below with reference to FIG. 7. In FIG. 7, a peripheral cell search is started in step ST301, and the CPICH reception power of a detected cell is measured in step ST302.

In step ST303, the scrambling code of the detected cell is identified, and broadcast information (BCH) is decoded.

In step ST304, the transmission power value of the detected cell is acquired from the decoded broadcast information. When the acquired transmission power value is equal to or greater than a predetermined threshold, the detected cell is determined to be a macrocell, and the flow proceeds to step ST305. On the other hand, when the acquired transmission power value is less than a predetermined threshold, the detected cell is determined to be a macrocell, and the flow proceeds to step ST306.

In step ST305, when a reception power value in the detected macrocell is found to exceed the maximum value held, the maximum value is updated, and the macro base station of the strongest reception power and its reception power value are held.

In step ST306, when a reception power value in the detected femtocell is found to exceed the maximum value held, the maximum value is updated, and the femto base station of the strongest reception power and its reception power value are held.

In step ST307, whether the processes of steps ST302 through step ST306 are finished with respect to all timings where a synchronous channel correlation calculation result to exceed a predetermined threshold is found, and, if these processes are finished for all timings, a peripheral cell search is finished, or, if these processes are not finished for all timings, a peripheral cell search continues being repeated. A peripheral cell search is performed from the timing where the synchronous channel correlation calculation value is the highest, and, when at least one macrocell or femtocell has been detected, the peripheral search may be finished.

In step ST308, a temporary value of total downlink transmission power is calculated based on the maximum peripheral cell CPICH reception power value measured. To be more specific, as shown in FIG. 6, the greater CPICH reception power is, the higher the temporary value of total downlink transmission power is set, in a range between the maximum value (Pmax1) and minimum value (Pmin1) of the values of power that can be transmitted by the femto base station, and, the lower CPICH reception power is, the lower the temporary value of total downlink transmission power is set within the range.

In step ST309, whether a peripheral femtocell has been detected upon the peripheral cell search process from step ST301 to step ST307 is determined. If a peripheral femtocell has been detected, the flow proceeds to step ST310, or, if a peripheral femtocell has not been detected, the temporary value of total downlink transmission power calculated in step ST308 is set as the total downlink transmission power value of a femto base station, and the interference control steps are terminated.

In step ST310, the power control range for the second-stage interference control is set. For example, as shown in. FIG. 6, a fixed power control range should be set around the temporary value of total downlink transmission power calculated in step ST308, to set the maximum value (Pmax2) and the minimum value (Pmin2) for the second-stage interference control.

Figure 8:
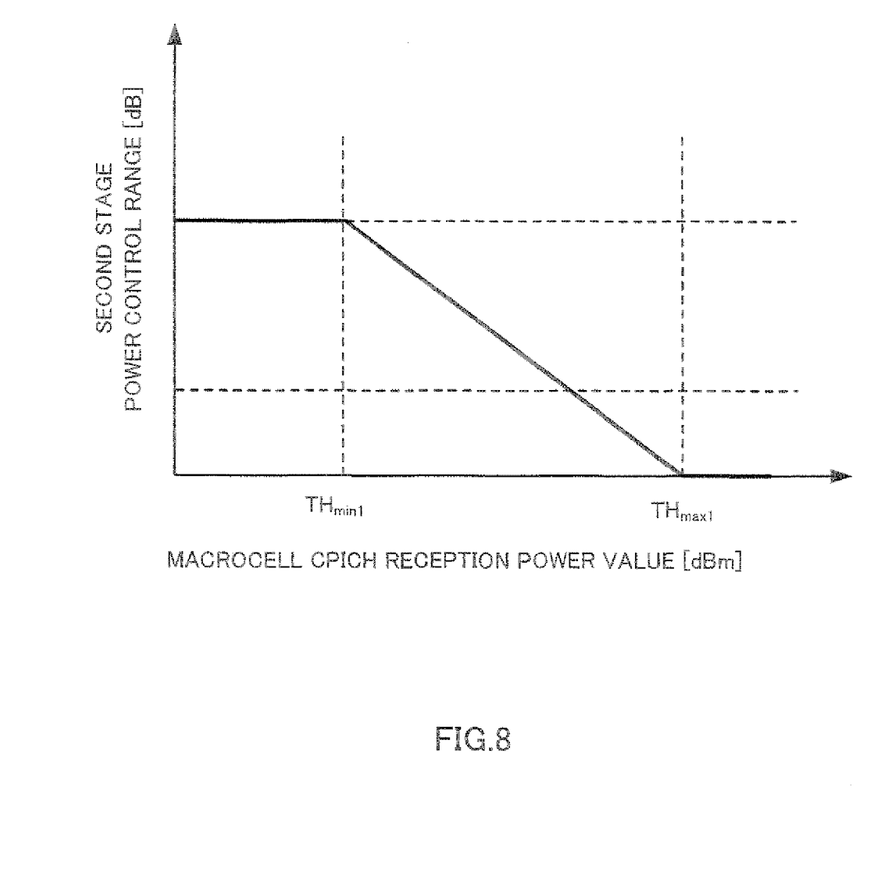
FIG. 8 illustrates a power control range setting method for the second stage in the total downlink transmission power setting section shown in FIG. 5.

The power control range may be determined based on in which location in a macrocell a femto base station is set up. That is, the power control range for the second stage is calculated based on the macrocell CPICH reception power value that was held in step ST305. For example, as shown in FIG. 8, when the macrocell CPICH reception power value is low (that is, lower than threshold THmin1), it is determined that a femtocell is set up near a cell edge of a macro base station, and the power control range for the second-stage interference control is set large. In addition, as the macrocell CPICH reception power value becomes larger, the power control range for the second stage is set smaller. Further, when the macrocell CPICH reception power value is large (that is, above threshold THmax1), it is determined that a femtocell is set up near a macro base station, and the power control range for the second-stage interference control is set to 0 dB (i.e. the second stage is not carried out).

in step ST311, an interference control between femto base stations, which is a second-stage interference control, is carried out. Specifically, as shown in FIG. 6, the total downlink transmission power value is set within the power control range set in the first stage, based on the maximum peripheral femtocell CPICH reception power value measured. The greater the CPICH reception power value is, the higher the total downlink transmission power value is set, or, the smaller the CPICH reception power value is, the lower the total downlink transmission power value is set.

When a neighboring CPICH reception power value is found too low, the second-stage interference control may not be carried out. To be more specific, based on whether or not a neighboring femtocell CPICH reception power value exceeds a predetermined threshold, the second stage is carried out if the value exceeds the threshold, or the second stage is skipped if the value does not exceed the threshold.

The power thresholds (THmax2 and THmin2) for the second stage shown in FIG. 6 may be set based on in which location in a macrocell a femto base station is set up. That is, power thresholds for the second stage are set according to the peripheral macrocell CPICH. reception power value that was held in step ST305. The total downlink transmission power value calculated in step ST311 is set as the downlink transmission power value of a femto base station.

According to embodiment 1, as apparent from the above, an interference control between a macrocell and a femtocell is performed as the first stage, an interference control between a femtocell and a peripheral femtocell is performed as a second stage, and a second-stage interference control is carried out without significantly deviating from a total downlink transmission power value that allows the first-stage interference control to be carried out in an optimal fashion, so that the throughput of a user of the subject femtocell user can be secured while reducing the amount of interference against a macrocell user and neighboring femtocell users in a well-balanced manner.

(Embodiment 2)

Since measurement of a macro base station is executed by a femto base station, in place of each individual femtocell user, and total downlink transmission power of the femto base station is decided, the transmission power control by the femto base station may not necessarily be set to provide optimal transmission power for each femtocell user. For example, a case might occur where, in an environment where an optimal transmission rate is set for a femtocell user, the femto base station sets excess downlink transmission power. In this case, a problem arises that a macrocell user near a femto base station suffers excess interference.

Now, on top of the interference control method described with embodiment 1, a case will be described with embodiment 2 of the present invention where downlink total transmission power of a femtocell is corrected base on reception quality measured by a femtocell user.

Figure 9:
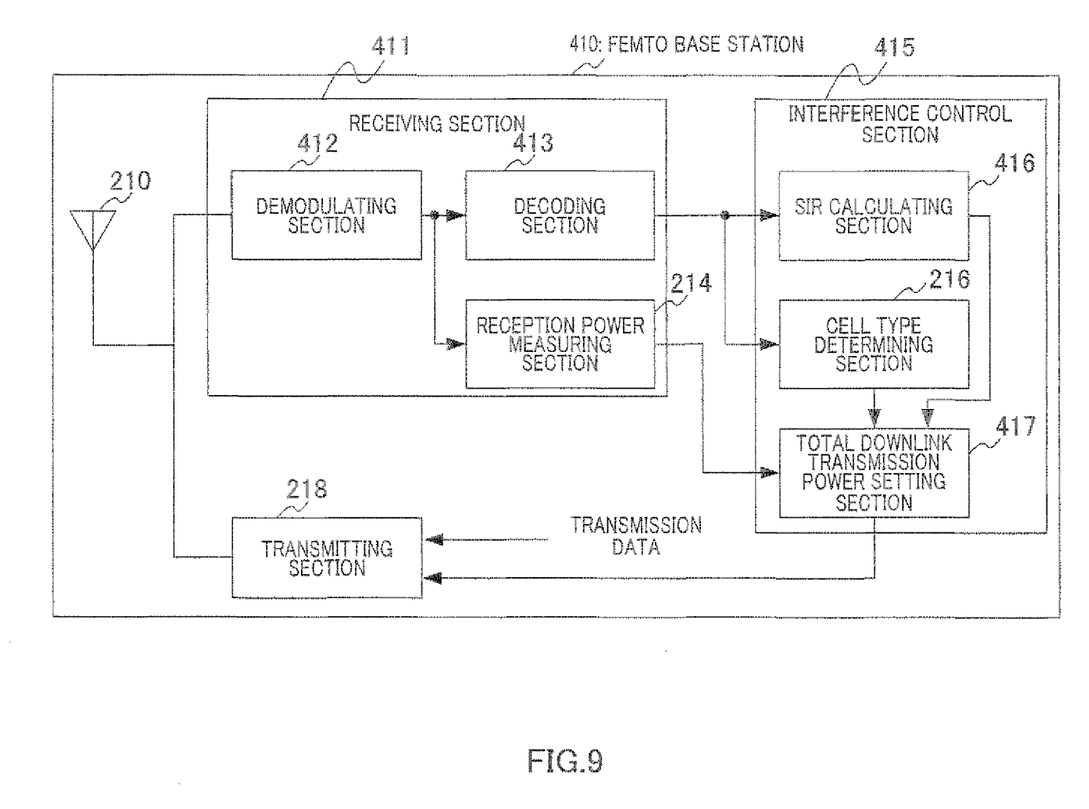
FIG. 9 is a block diagram showing the configuration of a femto base station according to embodiment 2 of the invention.

FIG. 9 is a block diagram showing the configuration of femto base station 410 according to embodiment 2 of the present invention. FIG. 9 differs from FIG. 5 in that demodulating section 212 is changed to demodulating section 412, decoding section 213 is changed to decoding section 413, total downlink transmission power setting section 217 is changed to total downlink transmission power setting section 417, and SIR calculating section 416 is added. Accompanying this, receiving section 211 is changed to receiving section 411, and interference control section 215 is changed to interference control section 415.

Demodulating section 412 executes predetermined demodulation on a signal received via antenna 210 in peripheral cell measurement mode, and outputs the demodulated signal to decoding section 413 and reception power measuring section 214. In addition, demodulating section 412 executes predetermined demodulation on a signal received via antenna 210 in standby mode to wait for reporting from a femtocell user, and outputs the demodulated signal to decoding section 413.

Decoding section 413 executes predetermined decoding, such as despreading or error correction decoding, on the signal output from demodulating section 412. In peripheral cell measurement mode, decoding section 413 decodes broadcast information from the macro base station or a peripheral femto base station, and outputs the decoded data to cell type determining section 216 in interference control section 415. In femtocell-user report standby mode, decoding section 413 decodes RSCP (Received Signal Code Power) and RSSI (Received Signal Strength Indicator) information, and outputs the decoded data to SIR calculating section 416 in interference control section 415.

SIR calculating section 416 calculates the SIR per user based on the RSCP and RSSI information that are output from decoding section 413 per femtocell user, and outputs an SIR calculation result to total downlink transmission power setting section 417.

Total downlink transmission power setting section 417 executes a second-stage interference control based on the cell type determination result and the measured reception power value, as per embodiment 1. Further, total downlink transmission power setting section 417 determines the minimum SIR value in the SIRs of a plurality of users, based on the SIRs of individual users output from SIR calculating section 416. When the determined minimum SIR value exceeds the SIR required for the maximum data rate in a CQI (Channel Quality Indicator) table for determining the data rate, an excess SIR value is calculated, and total downlink transmission power is reduced in a range that does not exceed the minimum value of transmission power of the femto base station. When the determined minimum SIR value does not exceed the SIR required for the maximum data rate in the CQI table, the total downlink transmission power value is set based on the cell type determination result and the measured reception power value.

Total transmission power of a femto base station may be reduced based on a CQI value reported from each user, instead of the SIR of each user. To be more specific, when the CQI reported from each user continues being the maximum value in the CQI table a predetermined number of times or more, the total downlink transmission power value is decremented.

The steps of interference control in interference control section 415 will be described with reference to FIG. 10. Parts in FIG. 10 that are the same as in FIG. 7 will be assigned the same reference numerals as in FIG. 7 and overlapping descriptions will be omitted.

Figure 10:
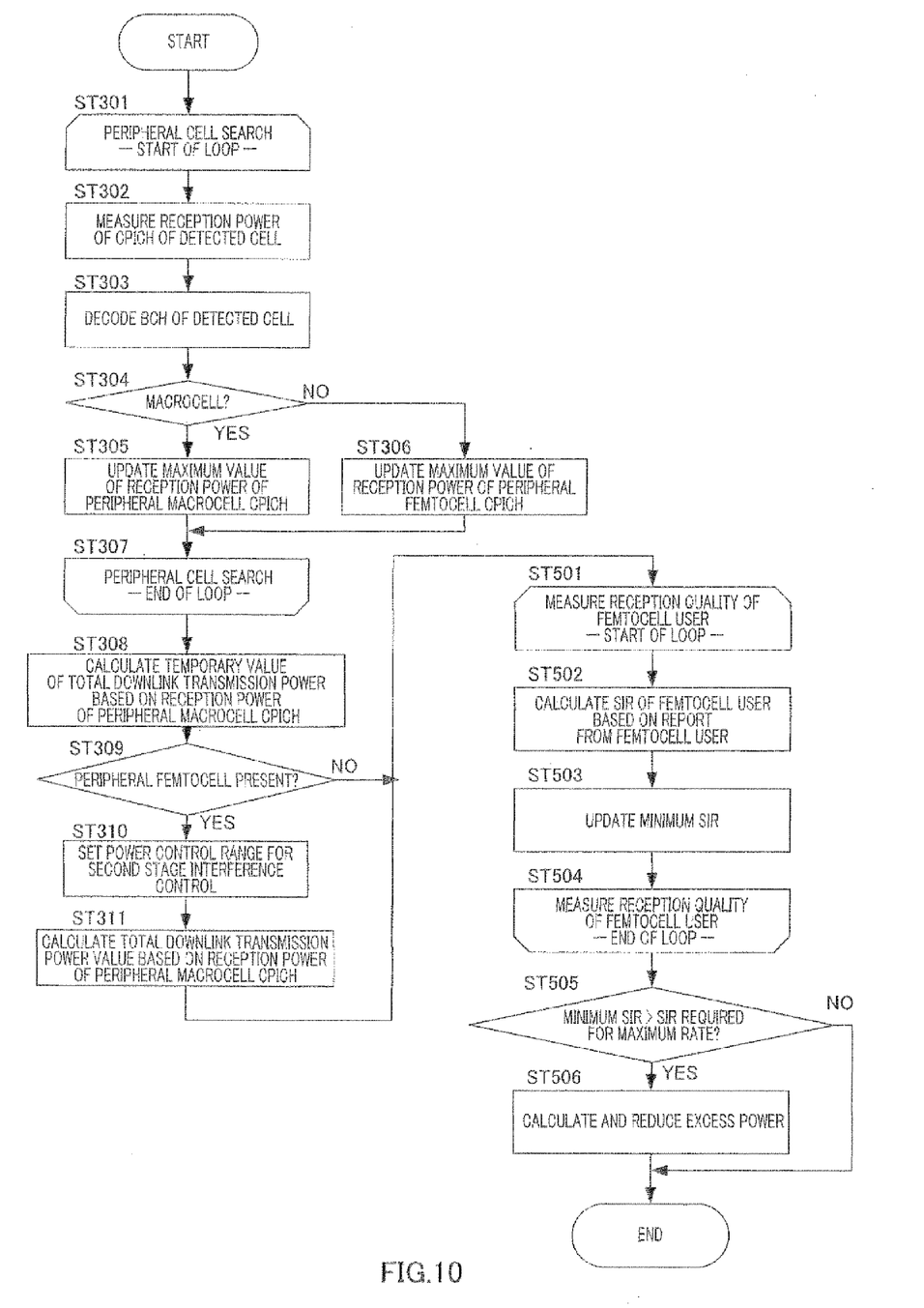
FIG. 10 is a flowchart illustrating the interference control steps of an interference control section shown in FIG. 9.

In FIG. 10, the result of measuring the reception quality of a femtocell user in a local cell is acquired in step ST501, and an SIR is calculated based on the RSCP and RSSI that are reported from the femtocell user in the local cell in step ST502. To be more specific, the calculation is performed from SIR=(RSCP/RSSI)×SF, where SF is the CPICH spreading factor.

In step ST503, whether or not the minimum SIR value in the iteration loop in steps ST501 through ST504 has been obtained is determined, and, if the minimum SIR value has been obtained, the minimum SIR value held is updated.

In step ST504, whether the processes are finished with respect to all users is determined, and, if they are, the flow moves to step ST505, or, if they are not, the processes from step ST501 through step ST504 are repeated.

In step ST505, a required SIR of HS-PDSCH (High Speed-Physical Data Shared Channel) of a high-speed data transfer channel required for individual CQI values is converted to a CPICH SIR, and the CPICH SIR value (SIRmax_CQI) required for the maximum CQI is compared with the minimum SIR value (SIRmin) held in step ST503. When the minimum SIR value is greater than the CPICH SIR value required for the maximum CQI, the flow moves on to step ST506, and when the minimum SIR value is lower than the CPICH SIR value, the process is terminated. Note that the minimum SIR value that was held in step ST503 may be reduced to an HS-PDSCH SIR, and, compared with the required SIR value of the HS-PDSCH required for the maximum CQI. The conversion from a CPICH SIR to an HS-PDSCH SIR, or the conversion from an HS-PDSCH SIR value to a CPICH SIR value can be calculated based on the spreading factor ratio and allocated power ratio between a CPICH and an HS-PDSCH.

In step ST506, the value of excess transmission power of the femto base station is calculated. Specifically, excess transmission power $\Delta$=SIRmin−SIRmax_CQI is reduced. However, note that this reduction should be carried out in a range that does not fall below the minimum value (Pmin1) of a femto base station. That is, when PHNB−$\Delta$ becomes smaller than the minimum value (Pmin1) of the femto base station, the minimum value (Pmin1) is set as the total downlink transmission power of the femto base station, and when PHNB−$\Delta$ is greater than the minimum. value (Pmin1) of the femto base station, PHNB−$\Delta$ is set as the total downlink transmission power of the femto base station. When every femtocell user is outside a femto base station service area, total downlink transmission power of a femto base station corrected and set according to the present embodiment is set according to the interference control method described in the description of embodiment 1—that is, it is set to a value calculated according to a second-stage interference control based on a cell type determination result and a measured reception power value.

According to embodiment 2, as apparent from the above, total downlink transmission power of a subject femto base station can be reduced in a range where the throughput of a user of the subject femtocell is not degraded, by reducing excess transmission power of the subject femto base station, so that it is possible to reduce interference against a macrocell user or peripheral femtocell users located near the femto base station while securing the throughput of the user of the subject femtocell.

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-304661, filed on Nov. 28, 2008, including the specification, drawings and abstract, is incorporated herein by reference in its entirety.

Industrial Applicability

The wireless communication base station apparatus and total transmission power control method according to the present invention are useful for a femto base station apparatus to be introduced in a cellular system.

The invention claimed is:

1. A wireless communication base station apparatus comprising:
   a measuring section that measures a reception level of a downlink common pilot signal;
   a determination section that determines whether the received downlink common pilot signal is a signal transmitted from a macro base station or a signal transmitted from a peripheral femto base station; and
   a power control section that executes a first power control to control total downlink transmission power in a first power control range according to the reception level of the downlink common pilot signal transmitted from the macro base station when the downlink common pilot signal is determined to be the signal transmitted from the macro base station, and that executes the first power control and a second power control to control the total downlink transmission power in a second power control range set smaller than the first power control range according to a result of the first power control and the reception level of the downlink common pilot signal transmitted from the femto base station when the measured downlink common pilot signal is determined to be the signal transmitted from the femto base station.

2. The wireless communication base station apparatus according to claim 1, wherein the power control section calculates a temporary value of total downlink transmission power through the first power control, and executes the second power control in the second power control range which is set around the calculated temporary value.

3. The wireless communication base station apparatus according to claim 2, wherein the power control section sets the second power control range according to the reception level of the downlink common pilot signal transmitted from the macro base station.

4. The wireless communication base station apparatus according to claim 2, wherein the power control section determines a control function of the second power control based on the reception level of the downlink common pilot signal transmitted from the macro base station.

5. The wireless communication base station apparatus according to claim 2, wherein the power control section determines whether or not to execute the second power control based on the reception level of the downlink common pilot signal transmitted from the macro base station.

6. The wireless communication base station apparatus according to claim 1, further comprising a decoding section that decodes reception quality information reported from a user device under the wireless communication base station apparatus,
wherein the power control section acquires excess reception quality for the user device based on the reception quality information, and reduces the total downlink transmission power by an amount equivalent to the acquired excess reception quality.

7. The wireless communication base station apparatus according to claim 6, wherein the power control section calculates a signal-to-interference ratio value of the user device based on the reception quality information, calculates an excess signal-to-interference ratio value from a desirable signal-to-interference ratio value which maximizes a data rate of the user device, and the calculated signal-to-interference ratio value, and reduces the total downlink transmission power by an amount equivalent to the calculated excess signal-to-interference ratio value.

8. The wireless communication base station apparatus according to claim 7, wherein when the total downlink transmission power resulting from reduction by the amount equivalent to the excess signal-to-interference ratio value becomes smaller than a settable minimum value of the total downlink transmission power, the power control section sets the total downlink transmission power to the settable minimum value.

9. The wireless communication base station apparatus according to claim 6, wherein, when there are a plurality of user devices, the power control section reduces the total downlink transmission power based on a minimum signal-to-interference ratio value among signal-to-interference ratio values of the user devices.

10. The wireless communication base station apparatus according to claim 6, wherein, when a channel quality indicator value of the user device continues being a maximum channel quality indicator value in a channel quality indicator table a predetermined number of times or more, the power control section reduces the total downlink transmission power by a predetermined value.

11. The wireless communication base station apparatus according to claim 10, wherein, when there are a plurality of user devices, the power control section reduces the total downlink transmission power by the predetermined value based on a minimum value channel quality indicator among channel quality indicator values of the user devices.

12. The wireless communication base station apparatus according to claim 6, wherein, when the user device is entirely out of range, the power control section sets again the total downlink transmission power calculated in the total downlink transmission power control section.

13. A total transmission power control method comprising:
a measuring step of measuring a reception level of a downlink common pilot signal;
a determination step of determining whether the received downlink common pilot signal is a signal transmitted from a macro base station or a signal transmitted from a peripheral femto base station; and
a power control step of executing a first power control to control total downlink transmission power in a first power control range according to a reception level of the downlink common pilot signal transmitted from the macro base station when the downlink common pilot signal is determined to be the signal transmitted from the macro base station, and executing the first power control and a second power control to control the total downlink transmission power in a second power control range set smaller than the first power control range according to a result of the first power control and the reception level of the downlink common pilot signal transmitted from the femto base station when the measured downlink common pilot signal is determined to be the signal transmitted from the femto base station.

* * * * *